(12) United States Patent
Baker (10) Patent No.: US 8,276,929 B1
(45) Date of Patent: Oct. 2, 2012

(54) TRAILER FOR A LIVESTOCK CHUTE

(76) Inventor: Michael D. Baker, St. Paul, NE (US)

(*) Notice: Subject to any disclaimer, the term of this patent is extended or adjusted under 35 U.S.C. 154(b) by 0 days.

(21) Appl. No.: 13/285,320

(22) Filed: Oct. 31, 2011

(51) Int. Cl.
*B60D 1/46* (2006.01)

(52) U.S. Cl. .................................. 280/490.1; 119/512

(58) Field of Classification Search ........... 280/490.1, 280/79.3, 30; 296/24.31, 24.3, 24.2, 50; 119/512, 513, 514, 733, 737
See application file for complete search history.

(56) References Cited

U.S. PATENT DOCUMENTS

| | | | |
|---|---|---|---|
| 2,466,102 A | 4/1949 | Heldenbrand | |
| 2,941,813 A | 6/1960 | Price | |
| 3,037,482 A | 6/1962 | Jackson et al. | |
| 3,796,191 A | 3/1974 | McIntire | |
| 3,929,104 A * | 12/1975 | Corbin | 119/734 |
| 4,201,157 A * | 5/1980 | Lambert | 119/752 |
| 4,366,775 A | 1/1983 | Tyquin | |
| 4,829,936 A | 5/1989 | Mollhagen | |
| 5,915,334 A * | 6/1999 | Cummings et al. | 119/723 |
| 5,924,385 A * | 7/1999 | Cossel | 119/512 |
| 6,102,370 A * | 8/2000 | Johnston | 254/89 H |
| 6,173,941 B1 * | 1/2001 | Johnston | 254/89 H |
| 2004/0086367 A1 * | 5/2004 | Isaacs | 414/679 |
| 2009/0064941 A1 * | 3/2009 | Daniels | 119/512 |

* cited by examiner

*Primary Examiner* — Tashiana Adams
(74) *Attorney, Agent, or Firm* — Dennis L. Thomte; Thomte Patent Law Office LLC (57) ABSTRACT

A trailer for a livestock chute with the trailer having a horizontally disposed frame with a forward end, a rearward end, a first side and a second side. The livestock chute is supported upon and secured to the frame means of the trailer. A first selectively retractable wheel assembly is mounted at the first side of the trailer and a second selectively retractable wheel assembly is mounted at the second side of the trailer. A pair of hydraulically operated jacks are secured to the forward end of the trailer and a pair of hydraulically operated jacks are secured to the rearward end of the trailer. The trailer and livestock chute may be raised and lowered by way of the retractable wheel assemblies and jacks.

6 Claims, 8 Drawing Sheets

TRAILER FOR A LIVESTOCK CHUTE

BACKGROUND OF THE INVENTION

1. Field of the Invention

This invention relates to a trailer for a livestock chute and more particularly to a trailer for a livestock chute wherein a selectively retractable wheel assembly is mounted at each side of the trailer. Further, this invention relates to a trailer for a livestock chute wherein a pair of cylinders are mounted at the forward end of the trailer for raising and lowering the forward end of the trailer. The trailer also has a pair of hydraulic cylinders mounted at the rearward end thereof for raising and lowering the rearward end of the trailer.

2. Description of the Related Art

Livestock chutes are used to process livestock such as livestock to perform such tasks on the livestock such as pregnancy checks, vaccinations, tagging, etc. The livestock chutes of the prior art are either portable or permanently fixed to the ground or some supporting surface. The advantage of a portable livestock chute is that it may be moved from location to location to process livestock at those locations rather than transporting the livestock to the livestock chute.

If the livestock chute is a portable chute, it is sometimes loaded onto a flatbed trailer or the like and pulled to the desired location. In most situations, the portable livestock chute must be unloaded from the trailer before it can be used to process livestock. The unloading and loading of the livestock chute is labor and time consuming.

Some prior art portable livestock chutes do have wheels mounted thereon for transporting the livestock chute from location to location but those prior art livestock chutes are not convenient to use and the wheels thereof may interfere with the processing operations at the job site due to the location of the transport wheels at the sides of the livestock chute.

SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

A trailer for a livestock chute is disclosed with the trailer including a frame means having a forward end, a rearward end, a first side and a second side. A selectively removable hitch means is provided at the forward end of the frame means for connection to a prime-mover such as a truck or the like. A first vertically disposed hollow support member, having upper and lower ends, is positioned at the first side of the frame means at the forward end thereof. A first tube, having upper and lower ends, is slidably mounted in the first support member and which is movable between retracted and extended positions with respect to the first support member. A first ground engaging shoe or pad is secured to the lower end of the first tube. A first vertically disposed hydraulic cylinder, having a base end and a rod end, which is movable between extended and retracted positions, is provided with the base end of the first hydraulic cylinder being connected to the first support member. The rod end of the first hydraulic cylinder is operatively connected to the first tube to move the first tube between extended and retracted positions.

The trailer also includes a second vertically disposed hollow support member, having upper and lower ends, which is positioned at the second side of the frame means at the forward end thereof. A second tube, having upper and lower ends, is slidably mounted in the second support member and which is movable between retracted and extended positions with respect to the second support member. A second ground engaging shoe or pad is secured to the lower end of the second tube. A second vertically disposed hydraulic cylinder, having a base end and a rod end, which is movable between extended and retracted positions, is provided with the base end of the second hydraulic cylinder being connected to the second support member. The rod end of the second hydraulic cylinder is operatively connected to the second tube to move the second tube between extended and retracted positions.

The trailer also includes a third vertically disposed hollow support member, having upper and lower ends, which is positioned at the first side of the frame means at the rearward end thereof. A third tube, having upper and lower ends, is slidably mounted in the third support member and which is movable between retracted and extended positions with respect to the third support member. A third ground engaging shoe or pad is secured to the lower end of the third tube. A third vertically disposed hydraulic cylinder, having a base end and a rod end, which is movable between extended and retracted positions, is provided with the base end of the third hydraulic cylinder being connected to the third support member. The rod end of the third hydraulic cylinder is connected to the third tube to move the third tube between extended and retracted positions.

The trailer further includes a fourth vertically disposed hollow support member, having upper and lower ends, positioned at the second side of the frame means at the rearward end thereof. A fourth tube, having upper and lower ends, is slidably mounted in the first support member and which is movable between retracted and extended positions with respect to the fourth support member. A fourth ground engaging shoe or pad is secured to the lower end of the fourth tube. A fourth vertically disposed hydraulic cylinder, having a base end and a rod end, which is movable between extended and retracted positions is provided with the base end of the fourth hydraulic cylinder being connected to the fourth support member. The rod end of the fourth hydraulic cylinder is connected to the fourth tube to move the fourth tube between extended and retracted positions.

The first and second hydraulic cylinders, when moved from the retracted to the extended positions, cause the forward end of the frame means to be vertically moved upwardly. The third and fourth hydraulic cylinders, when moved from their retracted positions to their extended positions, cause the third and fourth shoes to be moved into ground engagement with the ground. The third and fourth hydraulic cylinders, when moved form the retracted positions to their extended positions, cause the rearward end of the frame means to be vertically moved upwardly.

A first retractable wheel assembly is mounted at the first side of the frame means with the first retractable wheel assembly being selectively pivotally movable between a transport position and a non-transport position relative to the frame means. A second retractable wheel assembly is positioned at the second side of the frame means with the second retractable wheel assembly being selectively pivotally movable between a transport position and a non-transport position relative to the frame means. Each of the first and second retractable wheel assemblies includes a blocking device for selectively locking the retractable wheel assembly in the transport position. Each of the locking devices is movable between locked and unlocked positions.

The first and second retractable wheel assemblies, when in their transport position, and when the locking devices are in the locked position, and the first, second, third and fourth hydraulic cylinders are in their retracted positions, support the frame means above the ground. The first and second retractable wheel assemblies when in their transport positions, and the locking devices are in their locked positions, move upwardly with the frame means by the extension of the third and fourth hydraulic cylinders. The movement of the locking devices to the unlocked positions, after the wheel assemblies have been moved upwardly with the frame means by the extension of the third and fourth hydraulic cylinders, permitting the frame means to be lowered into ground engagement by the retraction of the first, second, third and fourth hydraulic cylinders from their extended positions.

It is therefore a principal object of the invention to provide an improved trailer for a livestock chute.

A further object of the invention is to provide a trailer for a livestock chute which includes a retractable wheel assembly at each side thereof.

A further object of the invention is to provide a trailer for a livestock chute wherein the retractable wheel assemblies thereof are maintained in a locked transport position by a locking means.

A further object of the invention is to provide a trailer for a livestock chute wherein the livestock chute thereon may be raised to a transport position or lowered to an operative position through the use of a pair of retractable wheel assemblies.

A further object of the invention is to provide a trailer for a livestock chute wherein the wheel assemblies thereof, when in a non-transport position, may be pivoted out of the way should they interfere with procedures being performed on the livestock when the livestock chute is in its ground engaging position.

A further object of the invention is to provide a trailer for a livestock chute which is easily converted from a transport position to non-transport position and vice versa.

A further object of the invention is to provide a trailer for a livestock chute wherein a pair of retractable wheel assemblies are provided thereon with the wheel assemblies being selectively removably mounted to the trailer.

These and other objects will be apparent to those skilled in the art.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DESCRIPTION OF THE PREFERRED EMBODIMENT

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

The numeral 10 refers to the trailer of this invention which is designed to have a livestock chute such as a squeeze chute 12 mounted thereon. Trailer 10 includes a frame means 14 having a forward end 16 and a rearward end 18. Frame means 14 includes a first longitudinally extending frame member 20 and a second longitudinally extending frame member 22. A cross frame member 24 is secured to and extends between the rearward ends of frame members 20 and 22. Frame member 26 extends forwardly and inwardly from the forward end of frame member 20 and frame member 28 extends forwardly and inwardly from the forward end of frame member 22. Frame member 30 is secured to the forward ends of frame members 26 and 28 and extends therebetween. A rebar platform 32 is provided at the forward end of frame means 14 which provides footing for animals exiting the chute 12. Platform 32 also provides a storage area therein where the hydraulic power supply is stored during transport. A cross-frame member 34 is secured to and extends between the frame members 20 and 22 rearwardly of the forward ends thereof. A plurality of spaced-apart support members 36 extend forwardly from frame member 34. The forward ends of the support members 36 are secured to either the frame members 26, 28 or 30.

An elongated and longitudinally extending tube 37 has its rearward end secured to frame member 34 and has its forward end extending through frame member 30 so as to provide a hatch receiver 38. The numeral 40 refers to a selectively removable hitch. Hitch 40 includes a horizontally disposed rear end hitch portion 42, an upwardly and forwardly extending intermediate hitch portion 44 and a horizontally extending front end hitch portion 46 which has a hitch ball coupler 48 at the forward end thereof. Handles 50 and 52 are secured to the hitch portions 44 and 46 respectively. A safety chain 54 is secured to hitch portion 46. The rear end hitch portion 42 has a transversely extending lock pin bore or opening of conventional design formed therein. Rear end hitch portion 42 is slidably receivable in the hitch receiver 38 and secured thereto by means of a locking pin extending through receiver 38 and the bore in hitch portion 42.

A vertically disposed post or support member tube 58 is secured to frame member 20 adjacent the forward end thereof. Tube 60 is vertically slidably received by post 58 and has a shoe or pad 62 secured to the lower end thereof. The rod end 63 of a hydraulic cylinder 64 is secured to shoe 62 at 66. The base end 68 of hydraulic cylinders 64 is secured to a bracket 70 which is secured to the upper end of post 58.

A vertically disposed post tube or support member 72 is secured to frame member 22 opposite to post 58 and has a hydraulic cylinder 74 secured thereto. Inasmuch as post 72 is identical to post 58, post 72 and hydraulic cylinder 74 will not be described in detail.

Vertically disposed hollow post tubes or support members 76 and 78 are secured to frame member 24 and extend upwardly therefrom. A cross member 80 is secured to the upper ends of posts 76 and 78 and extends therebetween. Tubes 82 and 84 are slidably mounted in posts 76 and 78 respectively and have ground engaging shoes or pads 86 and 88 secured to the lower ends thereof respectively. Hydraulic cylinders 90 and 92 are positioned within posts 76 and 78 respectively for raising and lowering tubes 82 and 84 respectively. The hydraulic circuitry for the hydraulic cylinders 58, 72, 90 and 92 will be described hereinafter.

An elongated shaft or axle 94 is secured to and extends between frame members 20 and 22 so that the ends thereof extend outwardly from frame members 20 and 22 respectively. Retractable wheel assemblies 96 and 96' are selectively removably secured to the ends of axle 94. Inasmuch as wheel assemblies 96 and 96' are identical, only wheel assembly 96 and its associated structure will be described in detail with "'" indicating identical structure on wheel assembly 96'.

Wheel assembly 96 includes an elongated tubular beam 98 has its forward end pivotally or rotatably mounted on the exposed end of axle 94 and which is held therein by a selectively removable sleeve or collar 100. The rearward end of beam 98 has an opening 102 formed therein. The rearward end of beam 98 is adapted to be selectively secured to a lock assembly 104 which is secured to the outer surface of frame member 20. Lock assembly 104 includes a hollow housing 106 having a front wall 108, outer wall 110, and back wall 112. A pair of spaced-apart wall members 114 and 116 extend forwardly from front wall 108 which are adapted to selectively receive the rearward end of beam 98 therebetween. A horizontally disposed rod or shaft 118 extends between wall members 114 and 116 adjacent the lower ends thereof which is adapted to limit the downward movement of the rearward end of beam 98 when the rearward end of beam 98 is received between the wall members 114 and 116, as will be described in more detail hereinafter.

Front wall 108 of housing 106 has an opening 120 formed therein which registers with a guide collar or sleeve 122 which is welded to the rearward side of front wall 108. The back wall 112 of housing 106 has an opening 124 formed therein which is aligned with collar 122 and opening 120. A lock pin 126 movably extends forwardly through opening 124, collar 122 and opening 120. Handle 128 is secured to the rearward end of lock pin 126 and extends transversely therefrom. Pin 130 extends transversely through lock pin 126 forwardly of back wall 112 so that the opposite ends of pin 130 protrude outwardly from lock pin 126. Spring 132 embraces lock pin 126 between back wall 112 of housing 106 and pin 130 to yieldably urge lock pin 126 forwardly to its forward locking position. A pair of spaced-apart studs 134 and 136 are secured to the rearward side of back wall 112 of housing 106 and extend rearwardly therefrom. A stud 138 is secured to the outer side of frame member 20 and extends transversely outwardly therefrom rearwardly of back wall 112. Cover members 140 and 142 close the upper and lower ends of housing 106 respectively.

The numeral 144 refers to a conventional stub torsion axle such as manufactured by Dexter Axle Company. Stub torsion axle 144 extends transversely to beam 98 and is secured thereto by a mounting structure 145 secured to the upper side of beam 98. The stub torsion axle 144 includes a spindle or axle 146 encased in rubber or the like in a housing 147 with the outer end of the spindle 146 having one end of a transversely extending link or trailing arm 148 fixed thereto. Arm 148 extends downwardly and rearwardly from the outer end of spindle 146. The outer end of the trailing arm 148 has a transversely extending spindle or axle 149 fixed thereto upon which a rotatable wheel hub 150 is mounted. Wheel 151 is mounted on hub 150 for rotation therewith.

Figure 1:
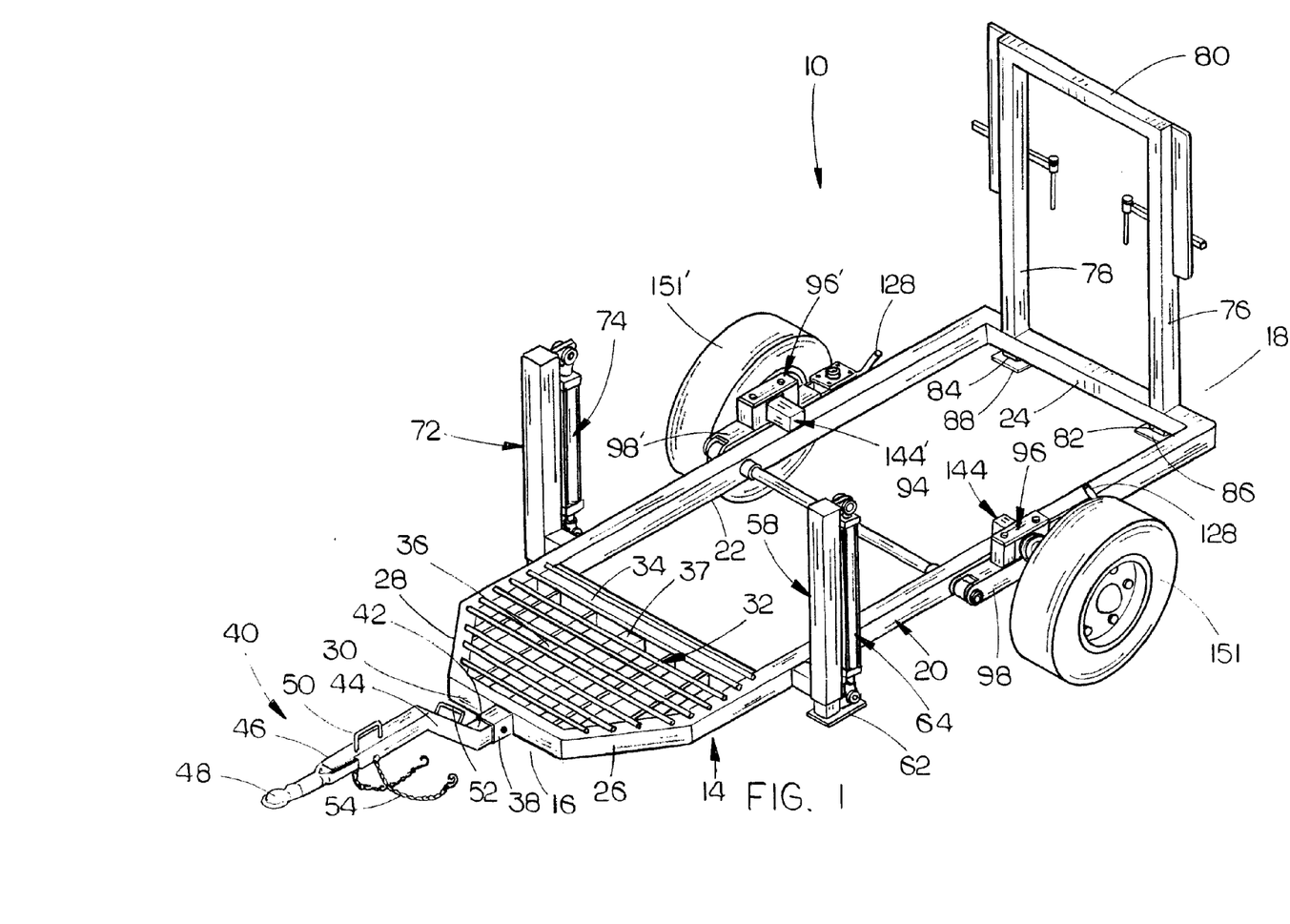
FIG. 1 is a front perspective view of the trailer of this invention in the transport position.
Figure 2:
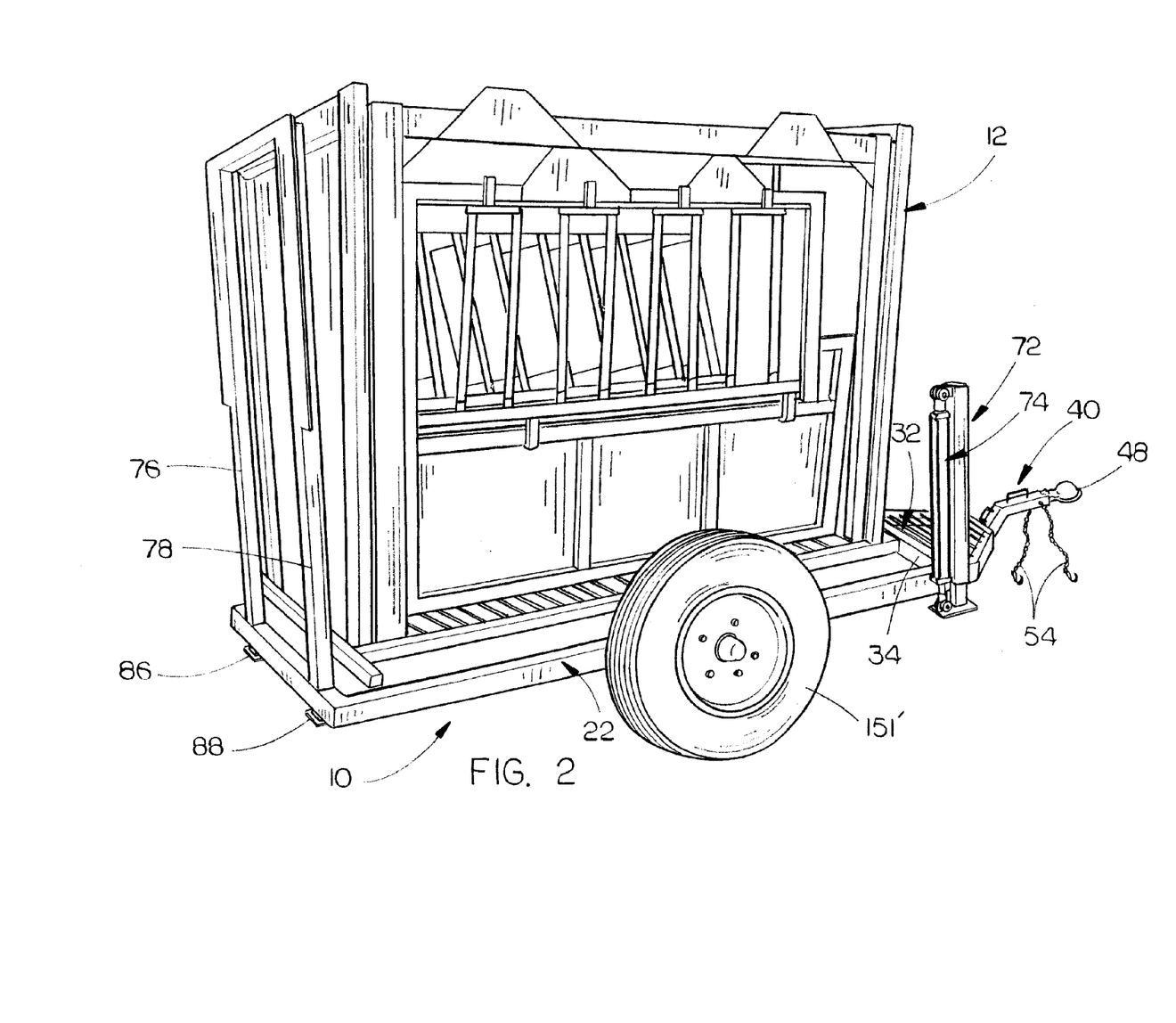
FIG. 2 is a rear perspective view of the trailer of this invention having a livestock chute mounted thereon with the trailer being in the transport position.
Figure 3:
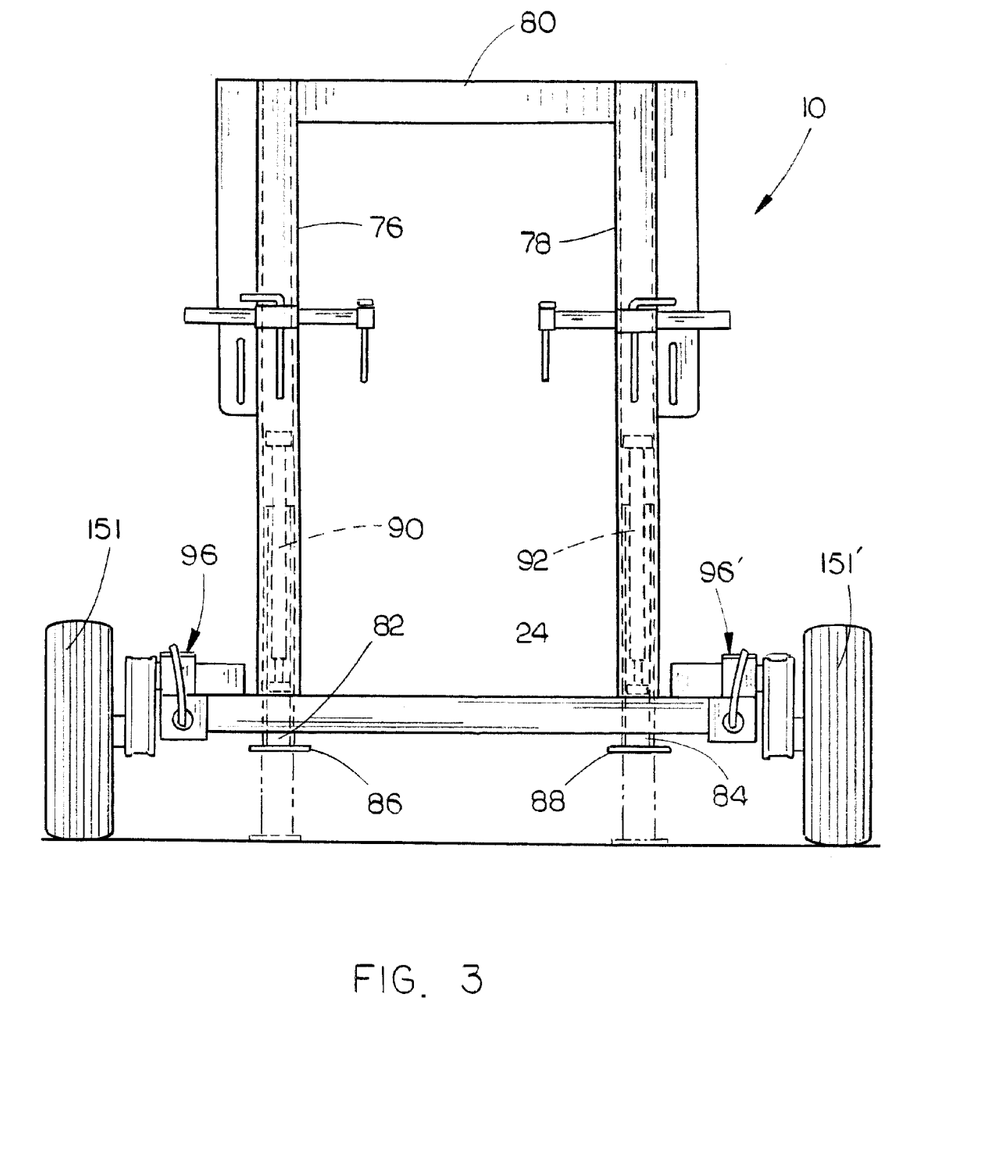
FIG. 3 is a rear elevational view of the trailer of this invention with the trailer being in a transport position.
Figure 4:
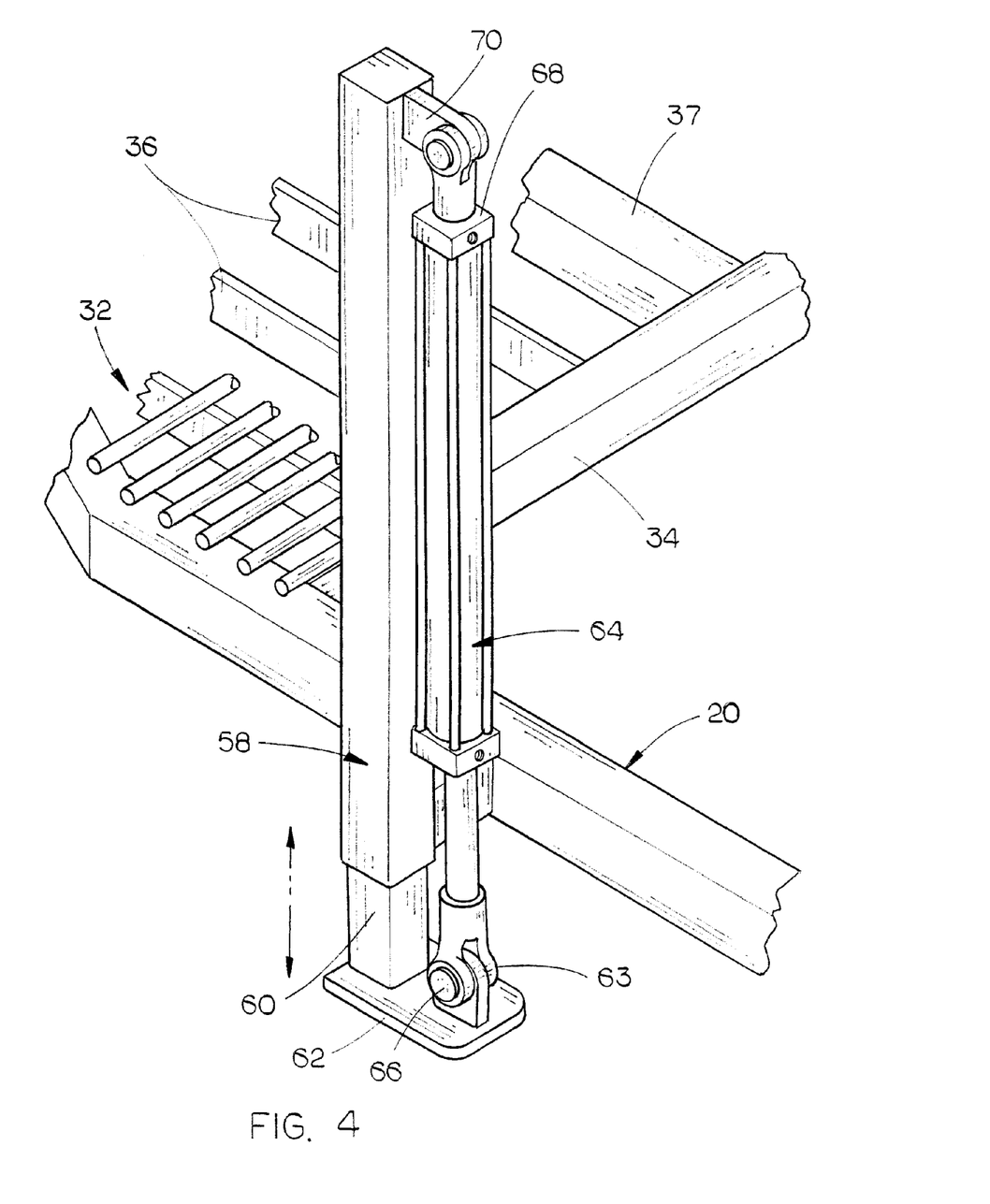
FIG. 4 is a partial front perspective view of the left or first forward side of the trailer and the hydraulic cylinder associated therewith.
Figure 5:
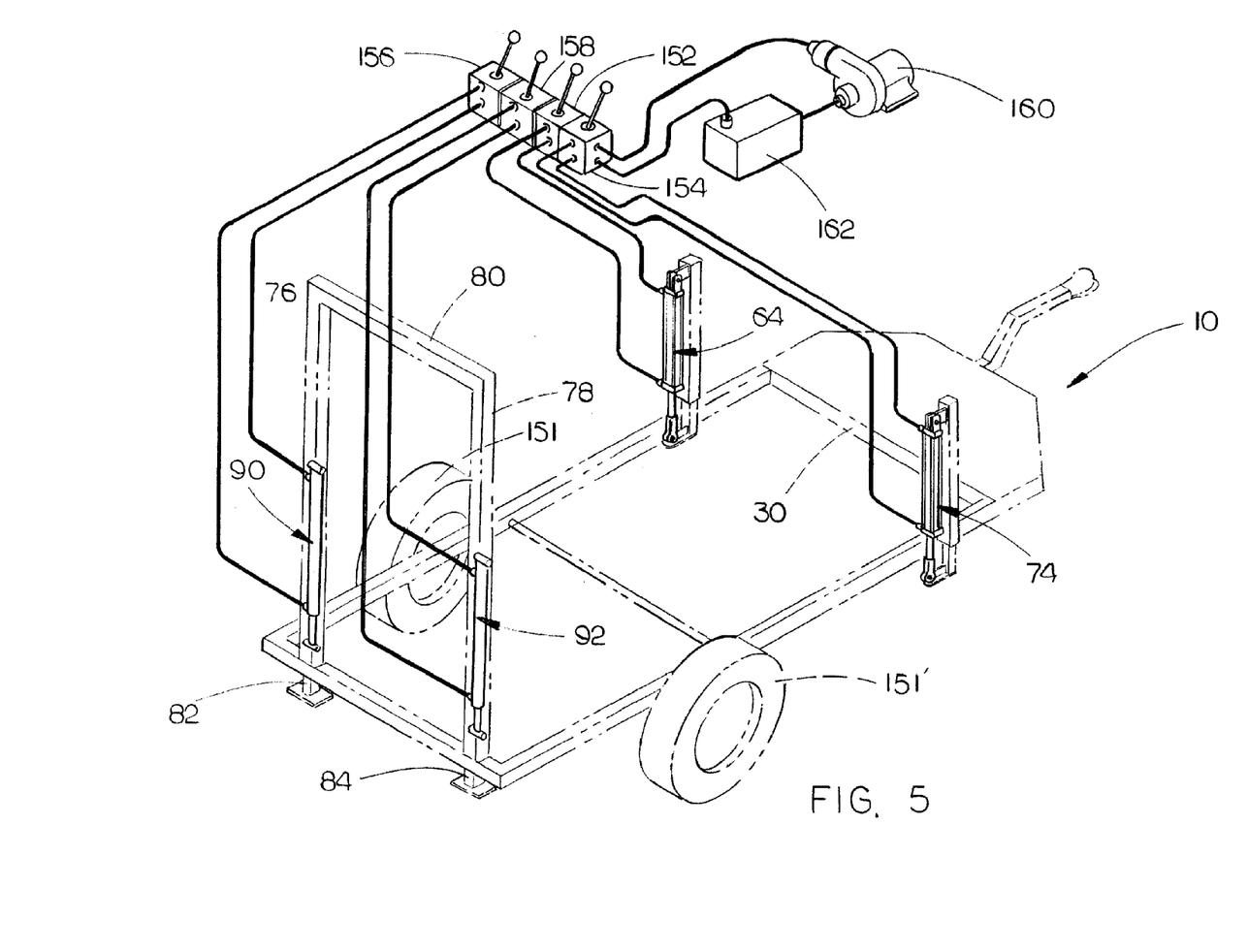
FIG. 5 is a schematic perspective view of the hydraulic circuitry of this invention.
Figure 6:
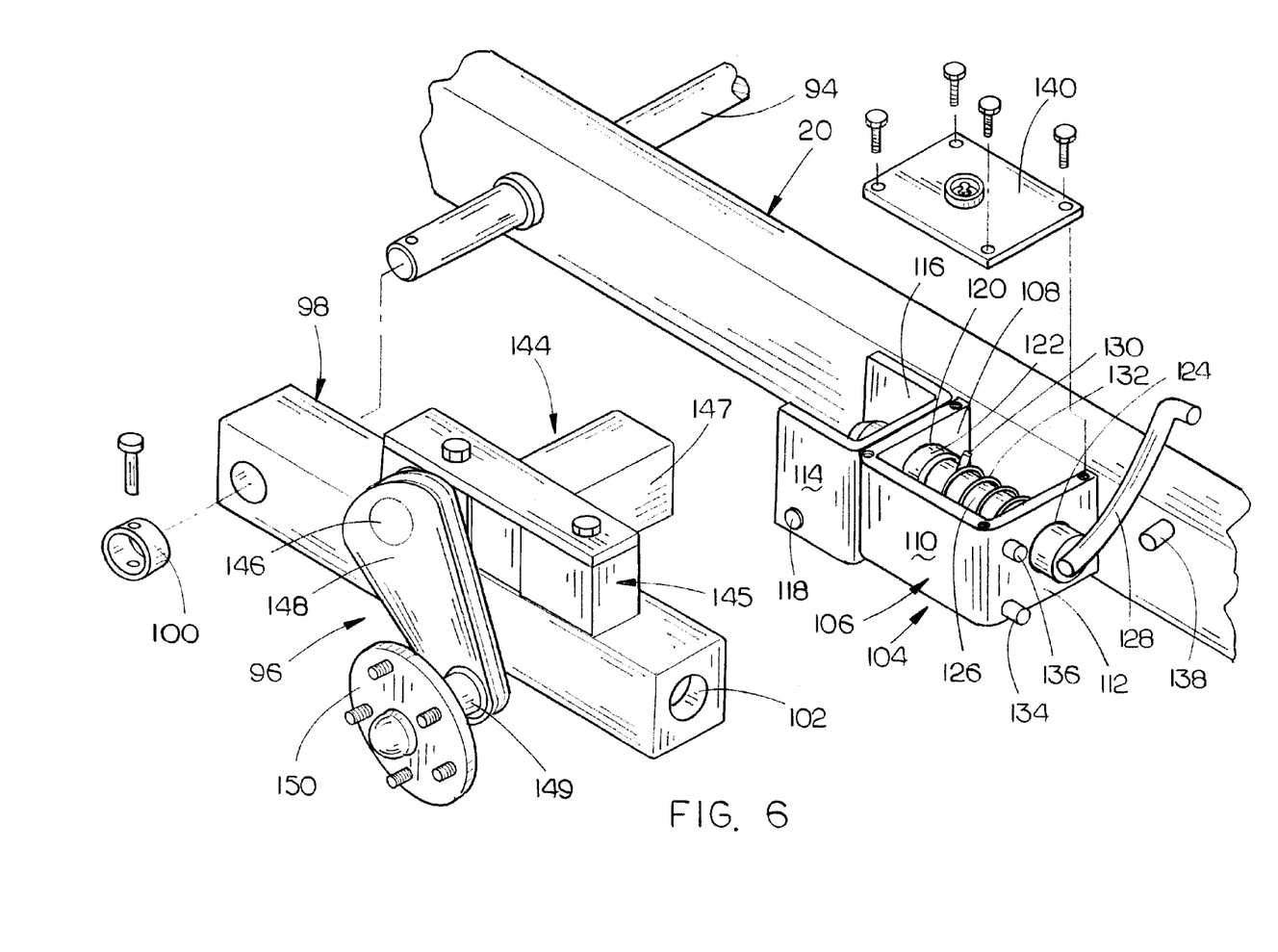
FIG. 6 is a partial exploded perspective view of one of the retractable wheel assemblies of this invention.

When the wheel assembly 96 is in its operative non-retracted transport position of FIG. 1, the rearward end of beam 98 is positioned between the wall members 114 and 116 and the forward end of lock pin 126 extends into the opening 102 in beam 98 to lock the wheel assembly in its transport position. As stated above, spring 132 yieldably urges lock pin 126 forwardly from housing 106. As will be discussed in more detail hereinafter, when lock pin 126 is to be moved to its "unlocked" position, the handle 128 will be pulled rearwardly to disengage lock pin 126 from the opening 102 in beam 90. At that time, handle 128 will be positioned rearwardly of stud 138 to maintain lock pin 126 in its rearward retracted or unlocked position.

The hydraulic cylinders 64, 74, 90 and 92 are double acting cylinders. As shown in the drawings, hydraulic cylinder 64 is controlled by valve 152 while hydraulic cylinder 74 is controlled by valve 154. However, it is preferred that hydraulic cylinders 64 and 74 are controlled by a single valve so that cylinders 64 and 74 are extended and retracted simultaneously. Hydraulic cylinder 90 is controlled by valve 156 while hydraulic cylinder 92 is controlled by valve 158. The valves 152, 154, 156 and 158 are fluidly connected to a hydraulic pump 160 and reservoir 162 in conventional fashion. Pump 160 is driven by a power means such as a battery driven electric motor or preferably by a gasoline or diesel engine. The valves 152, 154, 156 and 158 are attached to the trailer in a convenient location. The power pack including the engine, pump 160 and reservoir 162 are stored on the rebar platform 32 during transit.

The operation of the trailer 10 will now be described. Assuming that the livestock chute 12 has been previously mounted on and secured to the trailer 10, and the wheel assemblies are in their transport positions, the hydraulic cylinders 64 and 74 will have been extended somewhat so that the forward end of the hitch 40 is supported above the ground. The hydraulic cylinders 90 and 92 will be retracted during the hitching operation. The prime mover or truck will be backed up to the hitch 40. If the coupler 48 is positioned below the hitch ball of the truck, cylinders 64 and 74 will be further extended so that the coupler 48 will be raised to a position above the hitch ball. When the truck has been maneuvered into the proper position, the hydraulic cylinders 64 and 74 will be retracted so that the coupler 48 is moved downwardly onto the hitch ball. The safety chain 54 will then be connected to the hitch of the truck in conventional fashion. At that time, the handle 128 will be positioned above stud 136 to prevent the handle 128 from damaging the tire 151 during transport.

The trailer 10 may then be pulled to the desired location to process livestock. When the trailer has been backed up to a livestock alleyway or the like, the coupler 48 is moved to its unlocked position. The hydraulic cylinders 64 and 74 are then extended so that the forward end of the hitch 40 is raised until the coupler 48 disengages from the hitch ball. The truck is then driven forwardly away from the trailer so that it will not interfere with the processing of the livestock.

The hydraulic cylinders 90 and 92 are then extended so that the wheels 151 and 151' are raised slightly out of their ground engaging positions so that the binding forces on the lock pins 126 and 126' are removed. Lock pin 126 is then manually pulled rearwardly so that the forward end of lock pin 126 disengages from the opening 102 in beam 98. The handle 128 is then positioned rearwardly of stud 138 to maintain the lock pin 126 in its unlocked position. The same procedure is repeated for the wheel assembly 96'.

Figure 7:
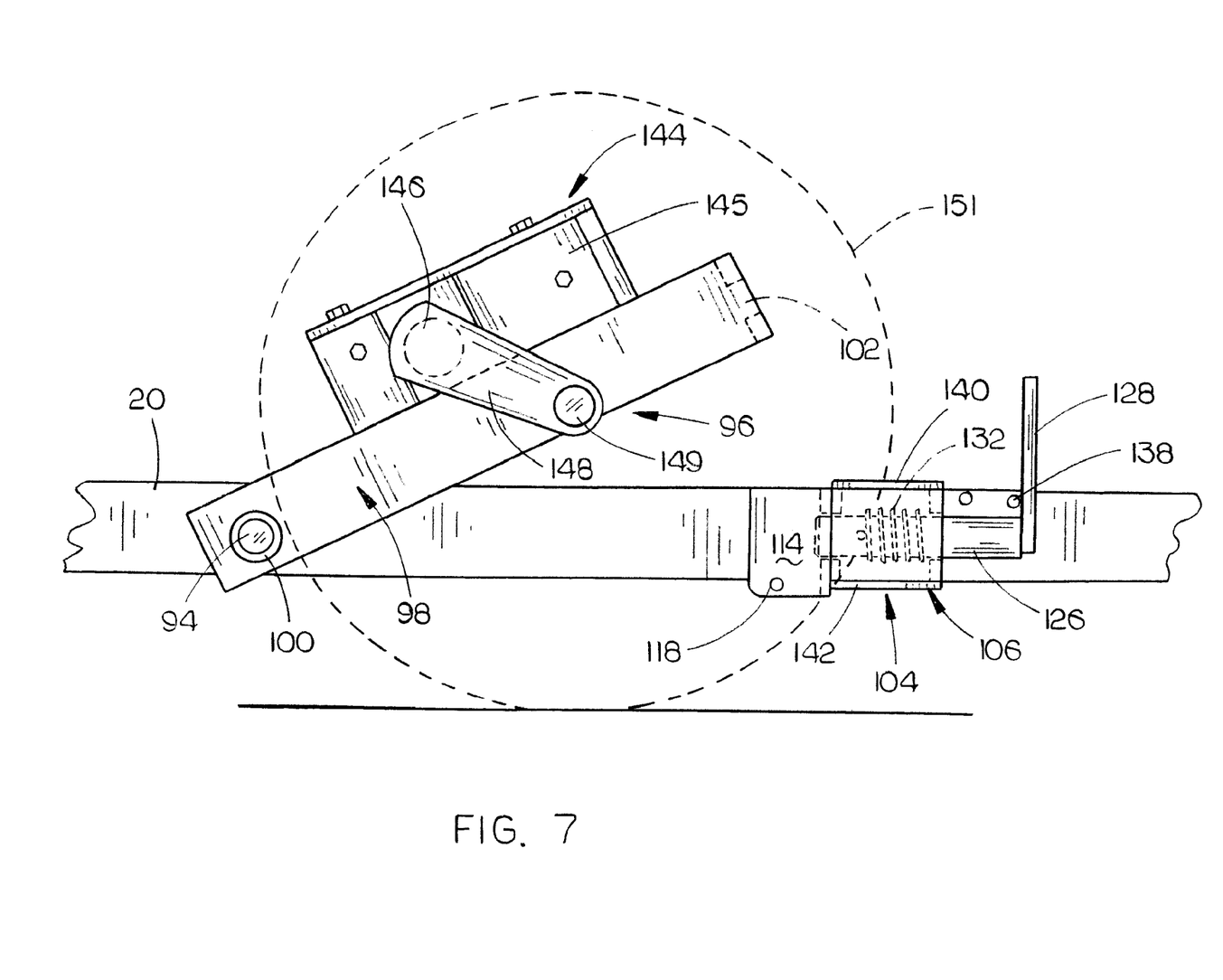
FIG. 7 is a side view of one of the retractable wheel assemblies illustrating the manner in which the frame means of the trailer is lowered into ground engagement.
Figure 8:
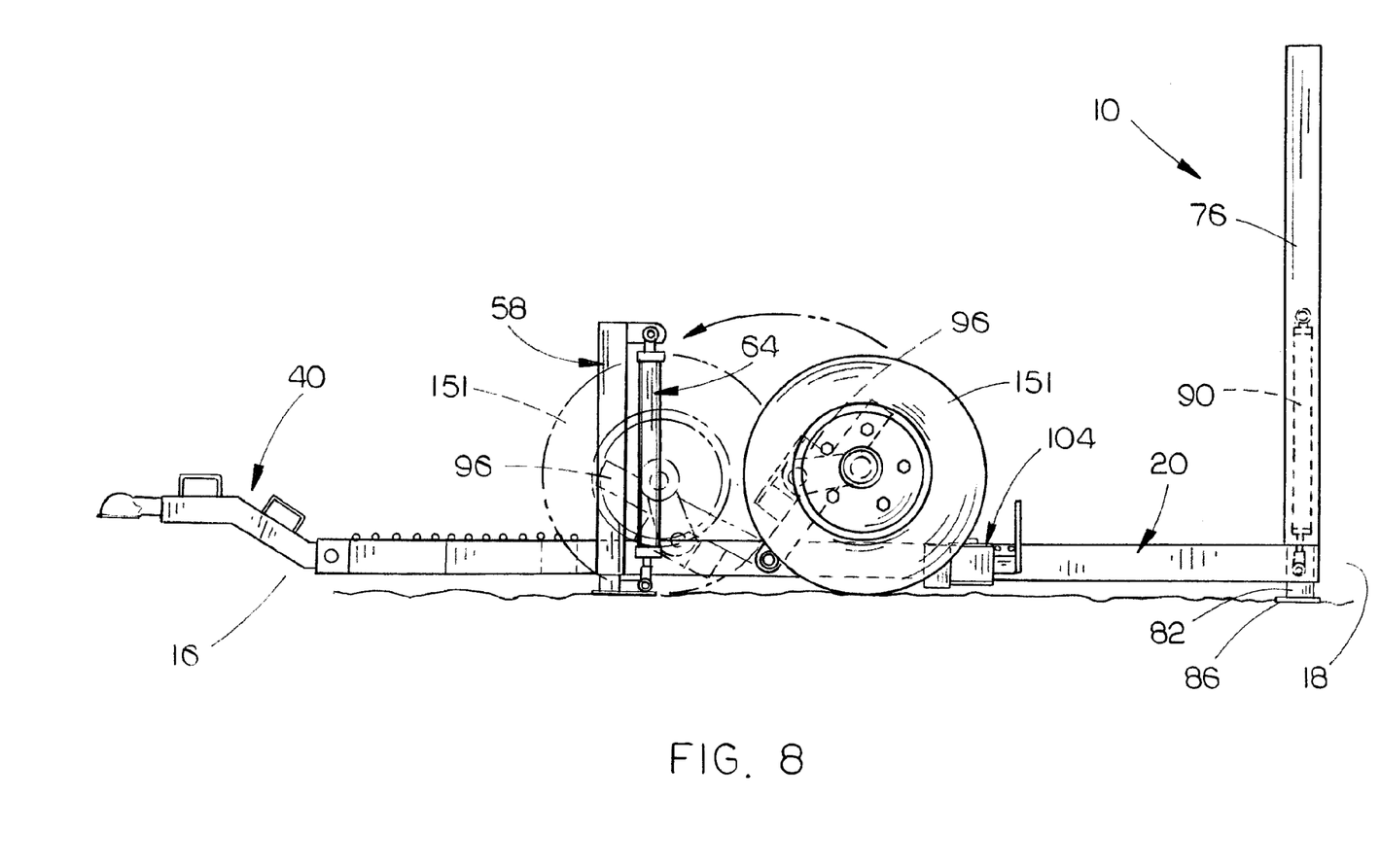
FIG. 8 is a side elevational view of the trailer in its lowered non-transport positions with the broken lines illustrating the manner in which the retractable wheel assembly may be pivotally moved forwardly from its normal non-transport position.

The hydraulic cylinders 64, 74, 90 and 92 are then retracted so that the trailer is lowered into ground engagement. The hydraulic cylinders may be used to level the trailer on uneven ground. Since the lock pins are in their unlocked positions, the assemblies 96 and 96' pivot with respect to the frame members 20 and 22 respectively in the manner depicted in FIGS. 7 and 8. At that time, the handle 128 will be positioned above stud 136 to keep the handle 128 from being crushed under the trailer as the trailer is lowered onto the ground. If the wheel assembly 96, shown by solid lines in FIG. 8, interferes with the processing operation, the wheel assembly 96 may be pivoted to the broken line position of FIG. 8. In the alternative, the entire wheel assembly 96 may be removed from the trailer by removing collar 100 from axle 94 and removing beam 98 from axle 94. The hitch 40 is removed from the trailer at this time.

When it is desired to move the trailer 10 and chute 12 to a different location, the hydraulic cylinders 64, 74, 90 and 92 will be extended until the beams 98 and 98' have pivoted into alignment with the lock pins. The lock pins are then moved to their locked positions. The cylinders 90 and 92 are then retracted. The hitch 40 is again secured to the trailer. The cylinders 64 and 74 are extended to raise the coupler 48 to a height sufficient to be positioned above the ball hitch of the truck. The cylinders 64 and 74 are then retracted to lower the coupler 48 onto the hitch ball. The cylinders 64, 74, 90 and 92 are then completely retracted if not already done so.

As the trailer is pulled over the road, the torsion axles provide a suspension system for the trailer.

Thus it can be seen that the invention accomplishes at least all of its stated objectives.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims hereinafter appended.

I claim:

1. A trailer for a livestock chute, comprising:
a frame means having a forward end, a rearward end, a first side and a second side;
a hitch means at said forward end of said frame means for connection to a prime mover;
a first vertically disposed hollow support member, having upper and lower ends, at said first side of said frame means at the forward end of said frame means;
a first tube, having upper and lower ends, slidably mounted in said first support member which is movable between retracted and extended positions with respect to said first support member;
a first ground engaging shoe at said lower end of said first tube;
a first vertically disposed hydraulic cylinder, having a base end and a rod end, which is movable between extended and retracted positions;
said base end of said first hydraulic cylinder being connected to said first support member;
said rod end of said first hydraulic cylinder being operatively connected to said first tube to move said first tube between said extended and retracted positions;
a second vertically disposed hollow support member, having upper and lower ends at said second side of said frame means at the forward end of said frame means;
a second tube, having upper and lower ends, slidably mounted in said second support member which is movable between retracted and extended positions with respect to said second support member;
a second ground engaging shoe at said lower end of said second tube;
a second vertically disposed hydraulic cylinder, having a base end and a rod end, which is movable between extended and retracted positions;
said base end of said second hydraulic cylinder being connected to said second support member;
said rod end of said second hydraulic cylinder being operatively connected to said second tube to move said second tube between said extended and retracted positions;
a third vertically disposed hollow support member, having upper and lower ends, at said first side of said frame means at the rearward end of said frame means;
a third tube, having upper and lower ends, slidably mounted in said third support member which is movable between retracted and extended positions with respect to said third support member;
a third ground engaging shoe at said lower end of said third tube;
a third vertically disposed hydraulic cylinder, having a base end and a rod end, which is movable between extended and retracted positions;
said base end of said third hydraulic cylinder being connected to said third support member;
said rod end of said third hydraulic cylinder being connected to said third tube to move said third tube between said extended and retracted positions;
a fourth vertically disposed hollow support member, having upper and lower ends at said second side of said frame means at the rearward end of said frame means;
a fourth tube, having upper and lower ends, slidably mounted in said first support member which is movable between retracted and extended positions with respect to said fourth support member;
a fourth ground engaging shoe at said lower end of said fourth tube;
a fourth vertically disposed hydraulic cylinder, having a base end and a rod end, which is movable between extended and retracted positions;
said base end of said fourth hydraulic cylinder being connected to said fourth support member;
said rod end of said fourth hydraulic cylinder being connected to said fourth tube to move said fourth tube between said extended and retracted positions;
said first and second hydraulic cylinders, when moved from said retracted positions to said extended positions causing said forward end of said frame means to be vertically moved upwardly;
said third and fourth hydraulic cylinders, when moved to said extended positions, causing said third and fourth shoes to be moved into engagement with the ground;
said third and fourth hydraulic cylinders, when moved from said retracted positions to said extended positions causing said rearward end of said frame means to be vertically moved upwardly;
a first retractable wheel assembly at said first side of said frame means;
said first retractable wheel assembly being selectively pivotally movable between a transport position and a non-transport position relative to said frame means;

a second retractable wheel assembly at said second side of said frame means;

said second retractable wheel assembly being selectively pivotally movable between a transport position and a non-transport position relative to said frame means;

each of said first and second retractable wheel assemblies including a locking device for selectively locking the retractable wheel assembly in said transport position;

each of said locking devices being movable between locked and unlocked positions;

said first and second retractable wheel assemblies, when in said transport position, and when said locking devices are in said locked position, and said first, second, third and fourth hydraulic cylinders are in said retracted positions, normally supporting said frame means above the ground;

said first and second retractable wheel assemblies, when in said transport position, and said locking devices are in said locked position, being moved upwardly with said frame means by the extension of said third and fourth hydraulic cylinders;

the movement of said locking devices to said unlocked positions, when said wheel assemblies have been moved upwardly with said frame means by the extending of said third and fourth hydraulic cylinders, permitting said frame means to be lowered into ground engagement by the retraction of said first, second, third and fourth hydraulic cylinders from their extended positions.

2. The trailer of claim 1 wherein said frame means includes a first longitudinally extending frame member at said first side thereof and wherein said frame means also includes a second longitudinally extending frame member at said second side thereof, with each of said first and second frame members, having rearward and forward ends, and wherein a transversely extending and elongated axle is secured to and extends between said first and second frame members with said axle having a first end positioned laterally outwardly of said first frame member and wherein said axle has a second end positioned laterally outwardly of said second frame member, and wherein said first retractable wheel assembly is pivotally secured to said first end of said axle and said second retractable wheel assembly is pivotally secured to said second end of said axle.

3. The trailer of claim 1 wherein said first retractable wheel assembly is selectively removably secured to said first end of said axle and wherein said second retractable wheel assembly is selectively removably secured to said second end of said axle.

4. The trailer of claim 2 wherein each of said first and second retractable wheel assemblies includes:
  (a) an elongated beam having forward and rearward ends with said forward end of said beam being pivotally secured to the associated end of said axle;
  (b) said beam being selectively pivotally movable, with respect to said axle, between a transport position and a non-transport position;
  (c) a locking device in selective engagement with said beam for locking said beam in said transport position;
  (d) a stub torsion axle assembly secured to said beam between said forward and rearward ends of said beam which includes a stub axle which is disposed transversely with respect to said beam;
  (e) a trailing arm having an upper forward end and a lower rearward end;
  (f) said upper forward end of said trailing arm being fixed to said stub axle for movement therewith;
  (g) a transversely and horizontally extending wheel axle fixed to said lower rearward end of said trailing arm; and
  (h) a wheel rotatably mounted on said wheel axle.

5. The trailer of claim 4 wherein said locking device comprises a spring-loaded locking pin which is selectively received by the rearward end of said beam.

6. The trailer of claim 4 wherein said locking device includes structure which selectively maintains said locking device in said unlocked position.

\* \* \* \* \*